INVENTOR.
Albert T. Weiss
BY Frank Keiper
ATTORNEYS.

A. T. WEISS.
WIRE BENDING MACHINE.
APPLICATION FILED JUNE 16, 1921.
1,429,814.
Patented Sept. 19, 1922.
10 SHEETS—SHEET 8.
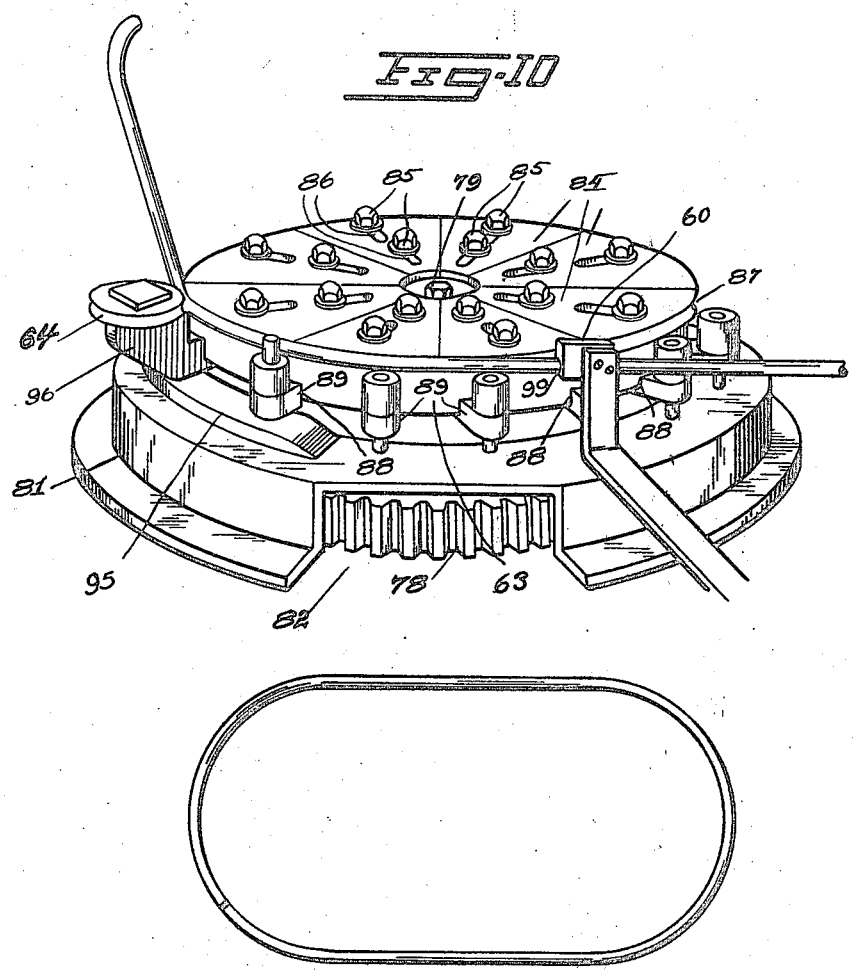

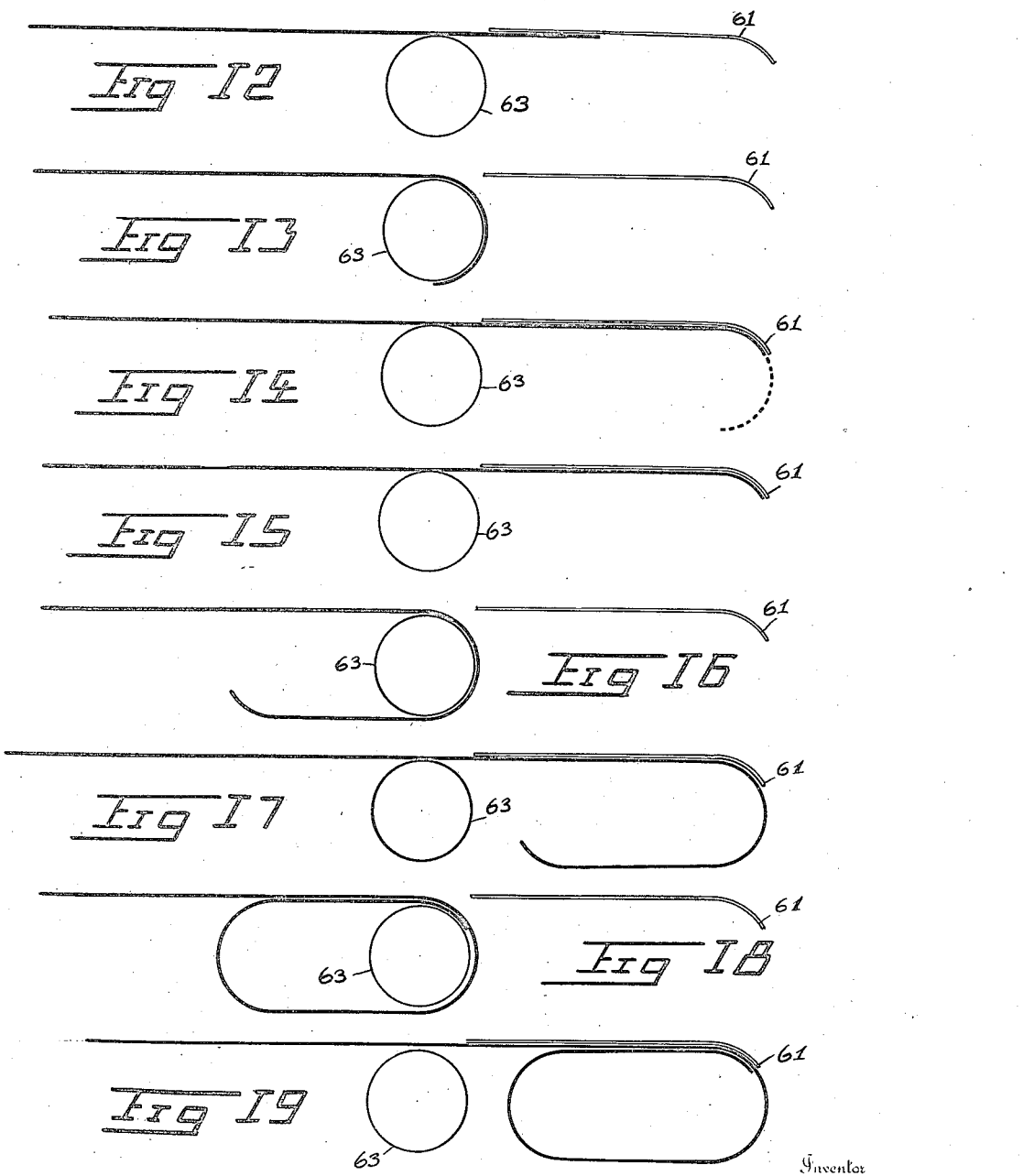

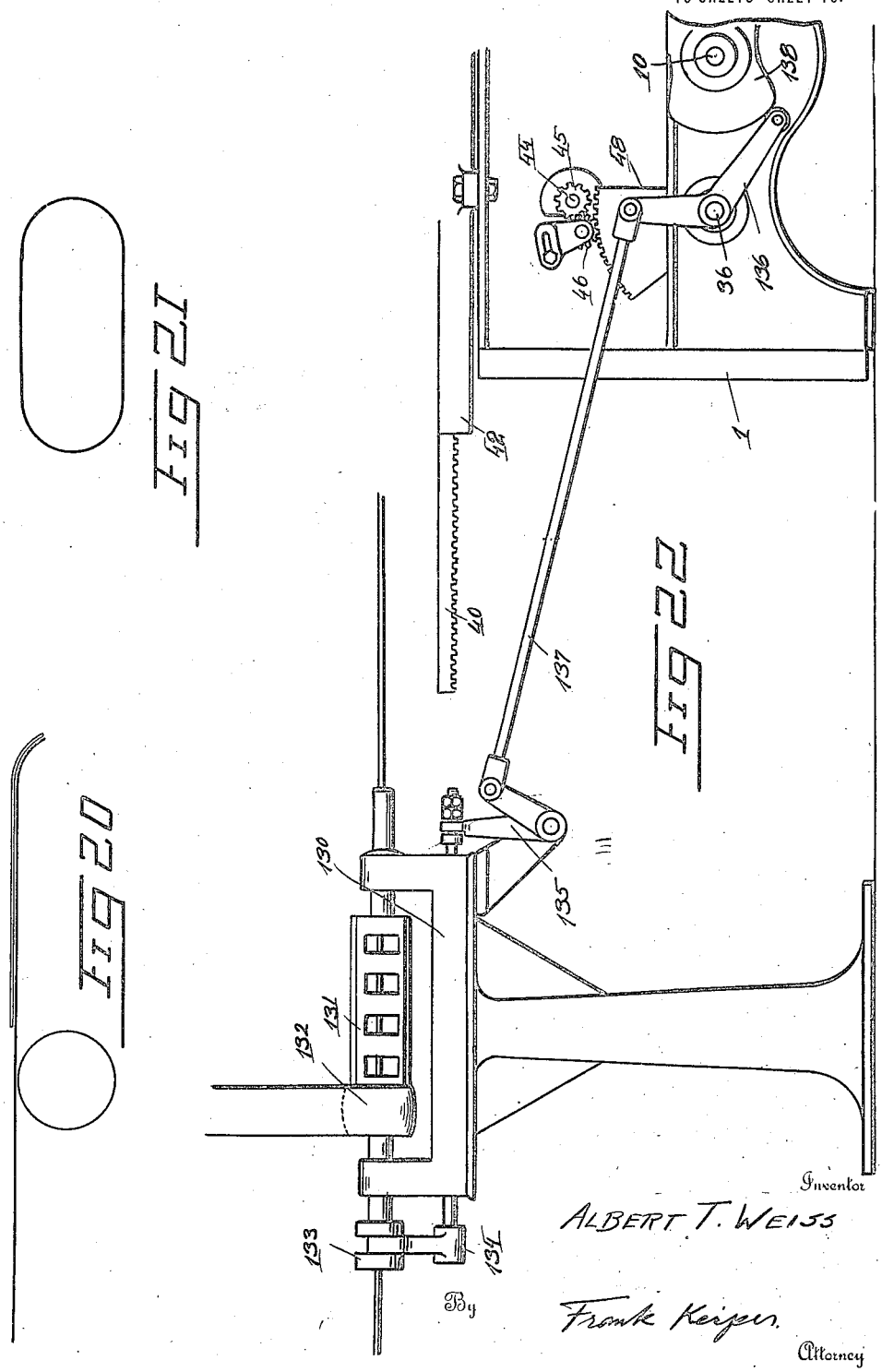

Patented Sept. 19, 1922.

1,429,814

UNITED STATES PATENT OFFICE.

ALBERT T. WEISS, OF ROCHESTER, NEW YORK.

WIRE-BENDING MACHINE.

Application filed June 16, 1921. Serial No. 478,159.

*To all whom it may concern:*

Be it known that I, ALBERT T. WEISS, a citizen of the United States, residing at Rochester, in the county of Monroe and State of New York, have invented certain new and useful Improvements in Wire-Bending Machines, of which the following is a specification.

The object of this invention is to provide a new and improved form of combination wire bending and cutting machine which is especially adapted to form the wire loops used to reinforce the rolled edge of wash boilers, etc.

This and other objects of this invention will be fully illustrated in the drawings described in the specification and pointed out in the claims at the end thereof.

In the accompanying drawings:

Figure 10 is a detail perspective view of the turn table with which the wire is bent into the loop.

Figure 11 is a plan view of the wire loop formed with the machine.

Figures 12 to 21 show diagrammatic views of the wire bending mechanism showing the successive stages in the forming of the wire loop.

Figure 1:
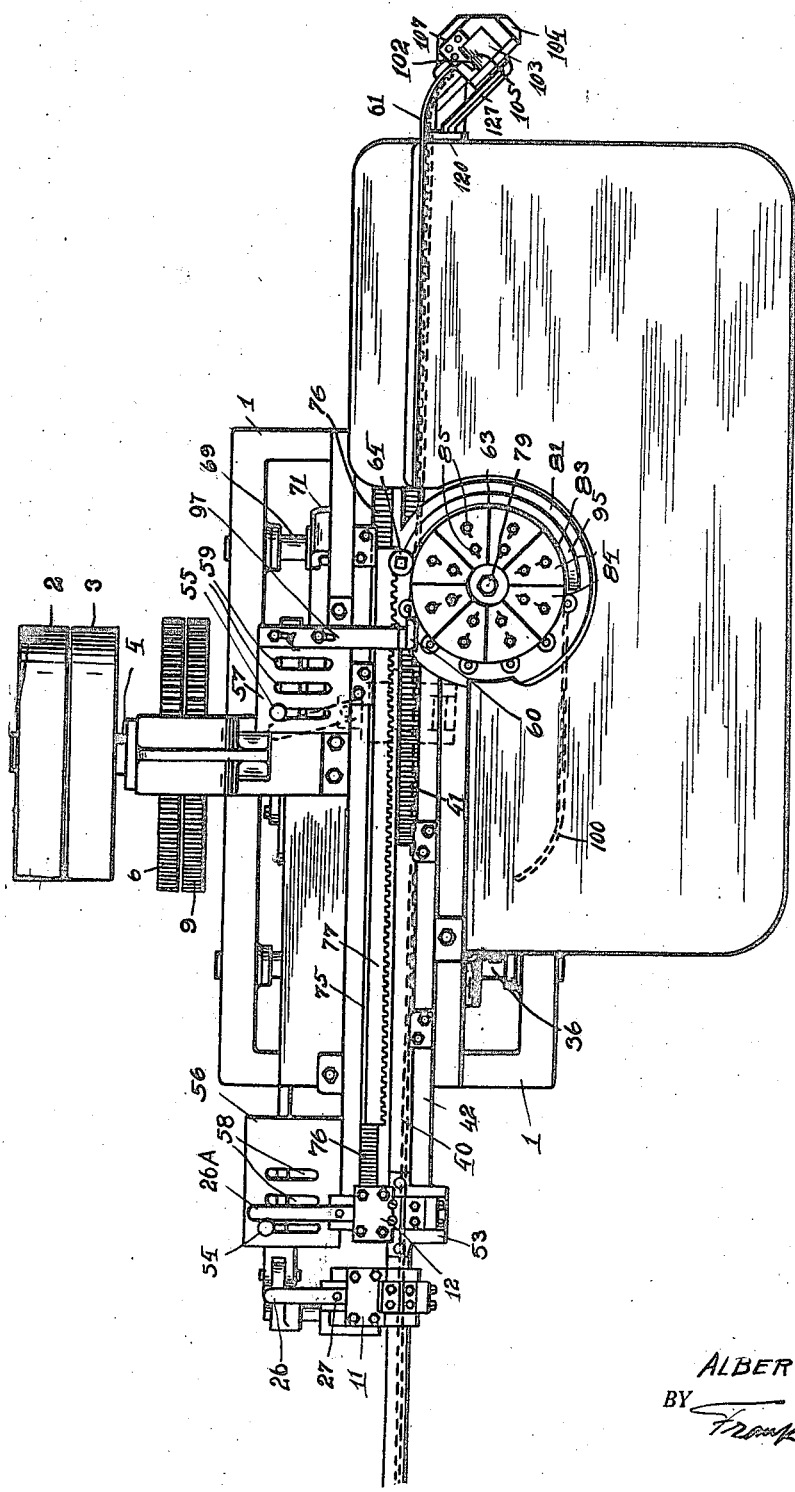
Figure 1 is a top plan view of the machine.

Figure 22 is a side elevation of the wire straightening machine used in connection with the wire bending and forming machine, a suitable operating mechanism for controlling the clutch of the wire straightening machine being shown provided between the wire bending and forming machine for the purpose of stopping and starting the straightening machine at suitable intervals during which the feeding mechanism remains idle.

In the several figures of the drawings like reference numerals indicate like parts.

Wash boilers and other similar containers made up of sheet metal are usually provided with a rolled edge at the top in order to make the edge smooth and at the same time increase the stiffness thereof. This rolled edge is reinforced on the inside by a wire loop having the outline of the top edge of the container. The sheet metal is folded, drawn or rolled over the wire loop which is thus held securely in place thereon to stiffen the top edge of the boiler.

The wire loops provided for this purpose have an oval outline formed by two half circles that are connected with straight sides as illustrated in Figure 11.

The machine for bending and cutting these wire loops forms the subject matter of this invention. This machine comprises a frame 1 in which the mechanism for forming these wire loops is mounted. The mechanism is driven by a train of gears which include the pulleys 2 and 3 mounted on the shaft 4. One of these pulleys is an idler and the other is keyed to the shaft 4 which it drives, a belt being used to drive both of the pulleys from a suitable source of power. Carried on the shaft 4 is the pinion 5 which meshes with the gear 6 keyed to the jack shaft 7. The jack shaft 7 has the pinion 8 keyed thereon alongside the gear 6 and this pinion meshes with the gear 9 carried on the power shaft 10. The train of gearing so far described simply reduces the R. P. M. of the motor or transmission from which the machine is driven in order to give the moving parts of the machine the proper speed.

The machine as a whole is a combination of a wire clamping, a wire feeding, a wire bending and a wire cutting mechanism all of which are timed in their operation in such a manner that the functions of each modifies the other until the complete wire loop is formed.

Each of these mechanisms will be described in the order in which they operate.

The wire clamping mechanism.

This mechanism comprises two distinctive clamps, one that is stationary and indicated by reference numeral 11, and the other which is movable and indicated by reference numeral 12. The latter operates in conjunction with the wire feeding mechanism while the former is driven independently but is timed to cooperate therewith. Except for the actual actuating means for the clamping mechanism, both of the clamps are identical in their construction and operation.

Each clamp comprises a base 13 having a channel 14 provided in the middle to receive holder 15 carrying the stationary and movable jaws 16 and 17 respectively. The right hand end of the holder 15 has a vertical flange 18 formed thereon in which a pair of set screws 19 and 20 are threaded. These set screws abut against the end of the stationary jaw 16 and can be adjusted in or out so that the jaw 16 is held in the holder 15 in the proper position with relation to the movable jaw 17 that is according to the size wire which is to be clamped between the jaws. A pair of clamping screws 21, 21 are provided to clamp the stationary jaw 16 in place on the holder 15 after it has been adjusted thereon by means of the set screws 19 and 20 as above described. Each of the clamping screws passes through a suitable slot 22 provided in the jaw and is threaded into the holder, the slots 22 being provided to permit the endwise movement for the adjustment of the jaw.

The movable jaw 17 is mounted on the carrier 23 which is mounted to slide on top of the holder 15 and between the walls of the channel 14 of the base 13 of the clamp. The carrier 23 is held in place on top of the holder by the cover plate 23$^A$ which is suitably fastened to the base 13 and bridges the channel 14 formed in the middle thereof.

The movable jaw 17 is operated by the toggle link 24 which is pivoted with one end thereof to the carrier 23 at 25, and with the other end to the bifurcated end of the toggle lever 26. The toggle lever 26 in turn is pivoted on the pivot pin 27 carried on the holder 13 around which pin it is mounted to swing on the engagement of the free end of the lever 26 with the actuating mechanism that will hereinafter be described.

Both the stationary and the movable jaws are provided with a V slot cut into the free end thereof to form the clamping faces between which the wire is held in place. Each of these V slots is preferably knurled on each of the converging sides of the slot to provide a surface that will readily grip a smooth surface when forced into engagement therewith. The movable jaw 17 is held in place on the carrier 23 by a pair of cap screws 28 which pass through suitable holes in the jaws and are threaded into the carrier below these holes.

Figure 3:
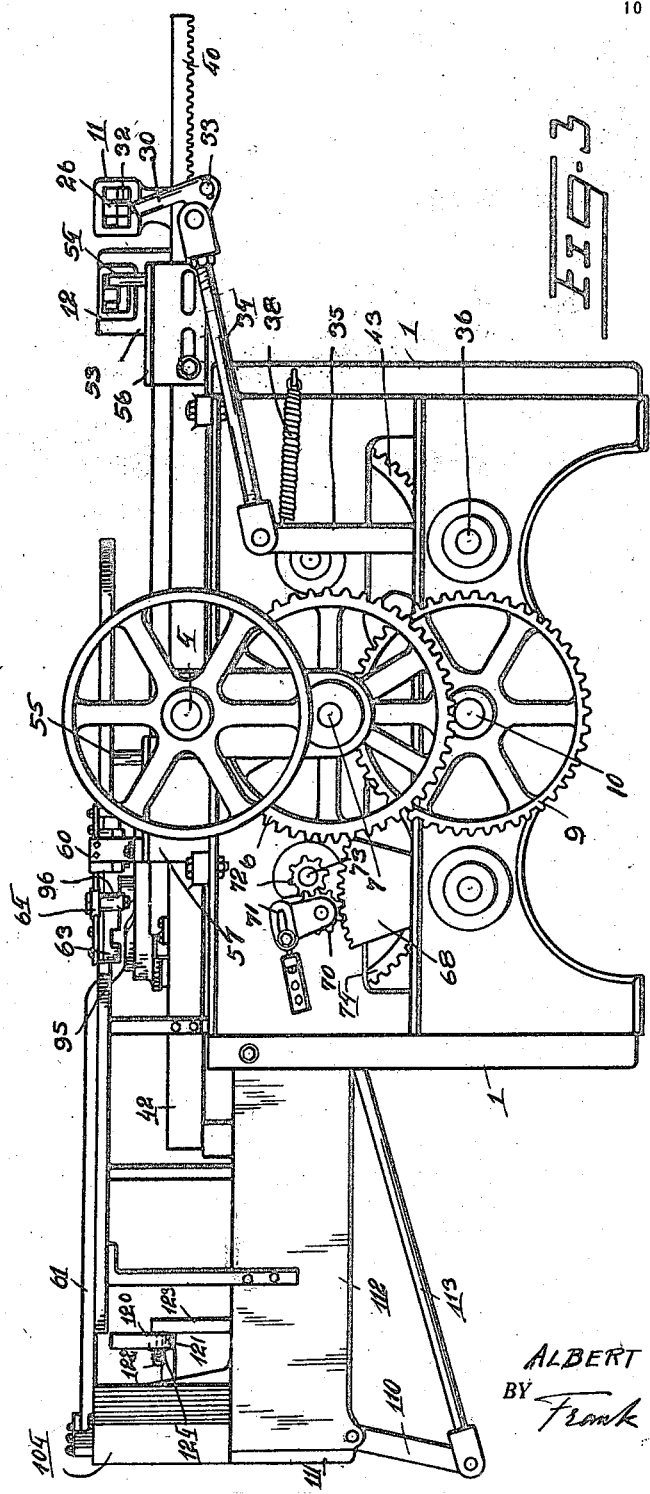
Figure 3 is a side elevation of the right hand side of the machine.
Figure 8:
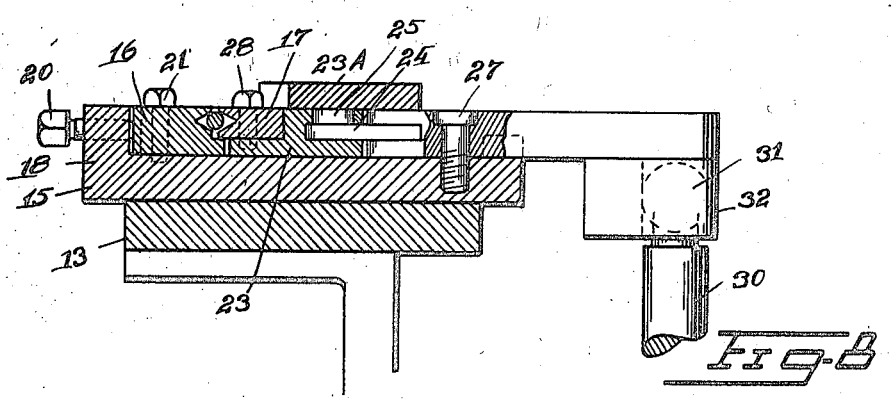
Figure 8 is a longitudinal cross section of the clamping device illustrated in Figure 7.
Figure 9:
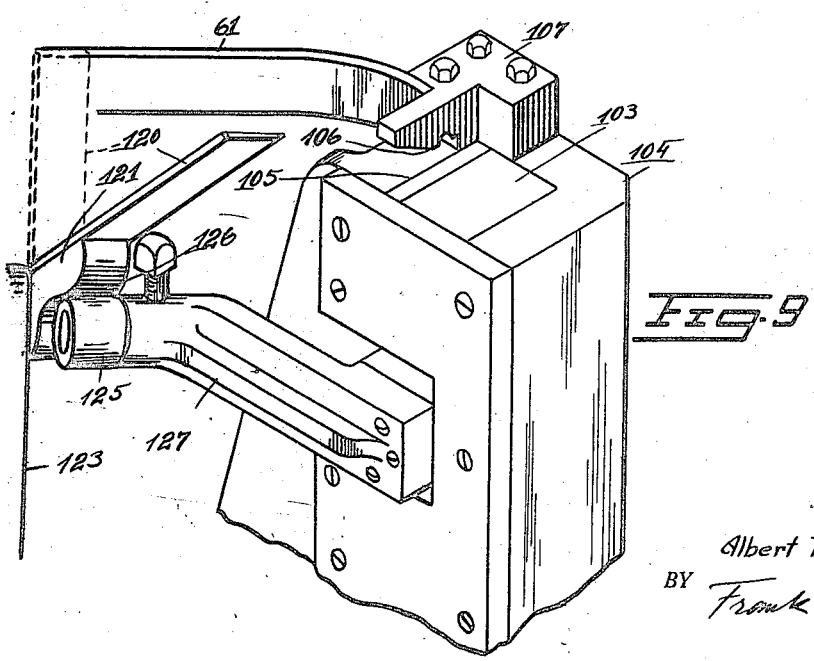
Figure 9 is a detail perspective view of the wire cutting mechanism.

The operation of the clamping mechanism is as follows:

The toggle lever 26 together with the toggle link 24 form a toggle joint which is operated on the movement of the toggle lever 26. The outer end of this toggle lever is operated by bell crank 30 by reason of its engagement therewith, a ball and socket connection being provided of which the ball 31 is formed on the end of the bell crank 30, and the socket 32, into which the ball engages, is formed on the under side of the outer end of the toggle lever 26 as illustrated in Figures 3 and 8.

Figure 7:
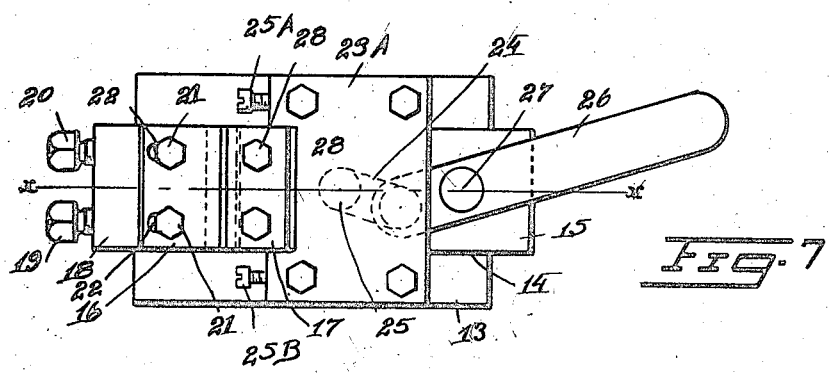
Figure 7 is a top plan view of one of the clamping devices used to hold the wire while it is being operated upon.

The bell crank 30 is mounted to rock on the pivot pin 33 carried on the frame 1 of the machine and is operated by the connecting rod 34 which is suitably pivoted to one end thereof. The connecting rod 34 in turn is operated by the cam lever 35 pivoted on the stud 36 carried in the frame 1. The cam lever 35 is made up in the form of a bell crank and the end of the crank not connected to the connecting rod 34 carries an anti-friction roller 39. The antifriction roller 39 is held in engagement with periphery of the cam 37 mounted and keyed to the power shaft 10 by the tension spring 38 stretched between the lever 35 and a suitable point on the frame. On the rotation of the power shaft through the train of gears previously described the cam surfaces formed on the cam operate to rock the lever 35 and this movement of the lever 35 is transmitted through the connecting rod 34 to the bell crank 30. The bell crank 30 in turn moves the toggle lever 26 and in so doing straightens out the toggle joint formed by the toggle lever and the toggle link. The toggle link then moves the carrier 23 with its jaw 17 toward the stationary jaw 16 and in so doing brings both of the gripping surfaces of the jaws closer together. The wire placed between the jaws is thus gripped in the clamping mechanism by being forced between the V slots of each of the jaws 16 and 17. The movement of the toggle lever from the position shown in Figure 7 to the position shown in Figure 1 is thus sufficient to tightly grip the wire in the clamping mechanism. This movement is secured by the rotation of the cam 37 which has projections and depressions that in connection with the spring 38 move the end of the bell crank lever carrying the antifriction roller 39 toward and away from the center of rotation of the cam sufficiently and at predetermined intervals to operate the toggle joint to either open or close the jaws 16 and 17 in order to release or hold the wire placed between them as above pointed out. For the purpose of stripping the wire from the jaws of the clamp, when the clamp is opened to release the wire a pair of stationary stripping pins 25^A and 25^B are provided, one on each side of the movable jaw 17. These stripping pins are formed by suitable screws that are threaded into the front of the stationary cover plate 23^A. When the wire is released by the jaws of the clamp by withdrawing the movable jaw from the stationary jaw the pins 25^A and 25^B prevent the wire from adhering to the movable jaw forcing the wire from the V shaped groove of the movable jaw. The heads of the stripping pins may be adjusted to project a variable distance from the cover plate, by threading the pins in or out therefrom. Wire of different thickness can thus be stripped from the movable jaw by adjusting these pins.

*The wire feeding mechanism.*

This mechanism comprises the clamp which is suitably mounted and carried on the reciprocating rack 40. This rack is mounted to slide in the channel 41 provided in the bed plate 42. The bed plate 42 is carried on top of the frame 1 to which it is suitably fastened so as to form a part thereof. The rack 40 has its teeth on the under side and the bedplate is cut away at a suitable point to permit the gear 43 to make engagement with the rack so that their teeth will mesh with one another. The gear 43 is mounted on the shaft 44 carried in the frame 1 and is rotated by means of the pinion 45 keyed to the outer end of the shaft and meshing with the idler pinion 46 carried in the yoke 47.

The idler pinion 46 in turn meshes with the segmental rack 48 by which it is rotated. The segmental rack 48 is mounted to rock on the stud 36. A lever 49 which is integral with the segmental rack carries on the outer end the antifriction roller 50. This roller engages into the cam slot 51 of the cam 52 so that on the rotation of the cam 52 the lever 49 and with it the segmental rack is given a rocking motion sufficient to rotate the pinions 46 and 45 and the gear 43 to move the rack 40 from one extreme position to the other thereof as illustrated by the full line and dotted line position of the clamp 12 in Figure 1.

The clamp 12 is mounted on the pedestal 53 carried on and suitably fastened to the rear of the rack 40. Its operation and construction is the same as that described in connection with clamp 11 except that it is operated to open and close its jaws by moving the clamp from the full line position to the dotted line position shown in Figure 1. During this travel of the clamp 12 the toggle lever 26^A comes in contact with the pins 54 and 55. Each of these pins is carried on top of an angle plate, the plate 56 carrying the pin 54 and the plate 57 carrying the pin 55. Each of these plates is provided with a series of slots 58 and 59 respectively which provide means whereby each of the pins may be placed in different positions on these plates in order to adjust them for earlier or later contact with the toggle lever 26^A of the clamp 12. In this way the clamp may be opened or closed at the proper time in order to grip or release the wire when it is being fed into the machine by the feeding mechanism.

When brought into engagement with the pin 54 carried on the plate 58 the toggle is straightened which closes the jaws and grips the wire. The clamping mechanism above described is timed so that on the gripping of the wire by the clamp 12 the wire is released by the clamp 11. The feeding mechanism then starts to move the clamp 12 and brings the clamp into the dotted line position shown in Figure 1. The wire previously gripped by the clamp 12 is thus pulled forward through the jaws 11 and fed into the machine. When this position has been reached the pin 55 has been brought in contact with the toggle lever 26^A which is rocked by the engagement. The toggle is thus operated to open the jaws when the the wire has been fed the required distance toward the bending mechanism. The angle plates or angle brackets 56 and 57 are suitably fastened to and supported by the frame. After the wire has been fed forward as above pointed out and is released by the jaws of the clamp 12 the jaws of the clamp 11 are again operated to grip the wire and take a new hold thereon.

*The wire bending mechanism.*

This mechanism begins to operate as soon as the clamp of the feeding mechanism has fed the wire to the desired point in the machine. This point is reached when the beginning of the wire which has previously been passed through the guide block 60 has reached the end of the curved guide 61. The beginning of the wire is curved to conform to the curve of the guide 61 and this curvature has been formed on the wire by a previous operation that will presently be described.

In feeding the wire from the guide block 60 to the curved guide 61 the wire is passed between the turn table 63 and the bending roller 64 carried by the turn table. As soon as the feeding of the wire is completed the cam 65 keyed on the power shaft 10 operates to rock the lever 66 by reason of its engagement therewith through the antifriction roller 67. The lever 66 is formed integral with the segmental rack 68 and both the segmental rack 68 and the lever 66 are mounted to rock on the stud 69 mounted in the frame 1.

Figure 6:
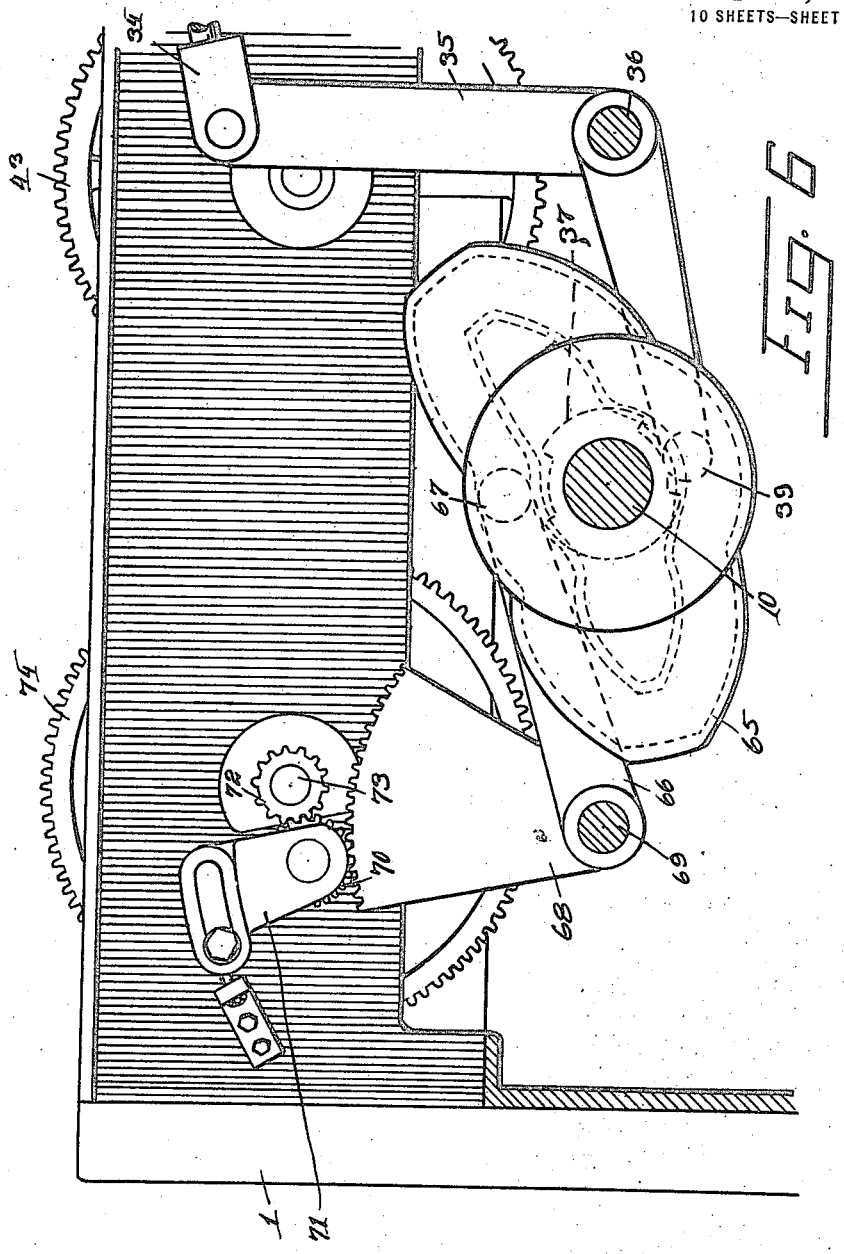
Figure 6 is a detail sectional view of a portion of the frame of the machine showing the driving mechanism for the wire bending and clamping mechanism.

The segmental rack 68 is adapted to mesh with the pinion 70 mounted to rotate in the yoke 71, and the pinion 70 in turn meshes with the pinion 72 keyed to the end of the shaft 73. The shaft 73 is mounted to rotate in suitable bearings provided in the frame 1 and has the gear 74 keyed thereto. This gear projects above the frame 1 as shown in Figure 6 and meshes with the rack 75. This rack is mounted to slide in the channel 76 provided in the bed plate 42 and adjacent to the channel 41 in which the rack 40 is mounted to slide. Fastened to the upper and blank side of the rack 76 or formed integral therewith is a second rack 77 having its teeth cut into the side thereof. This second rack is adapted to mesh with the horizontally mounted gear 78 carried on the stud 79.

Figure 2:
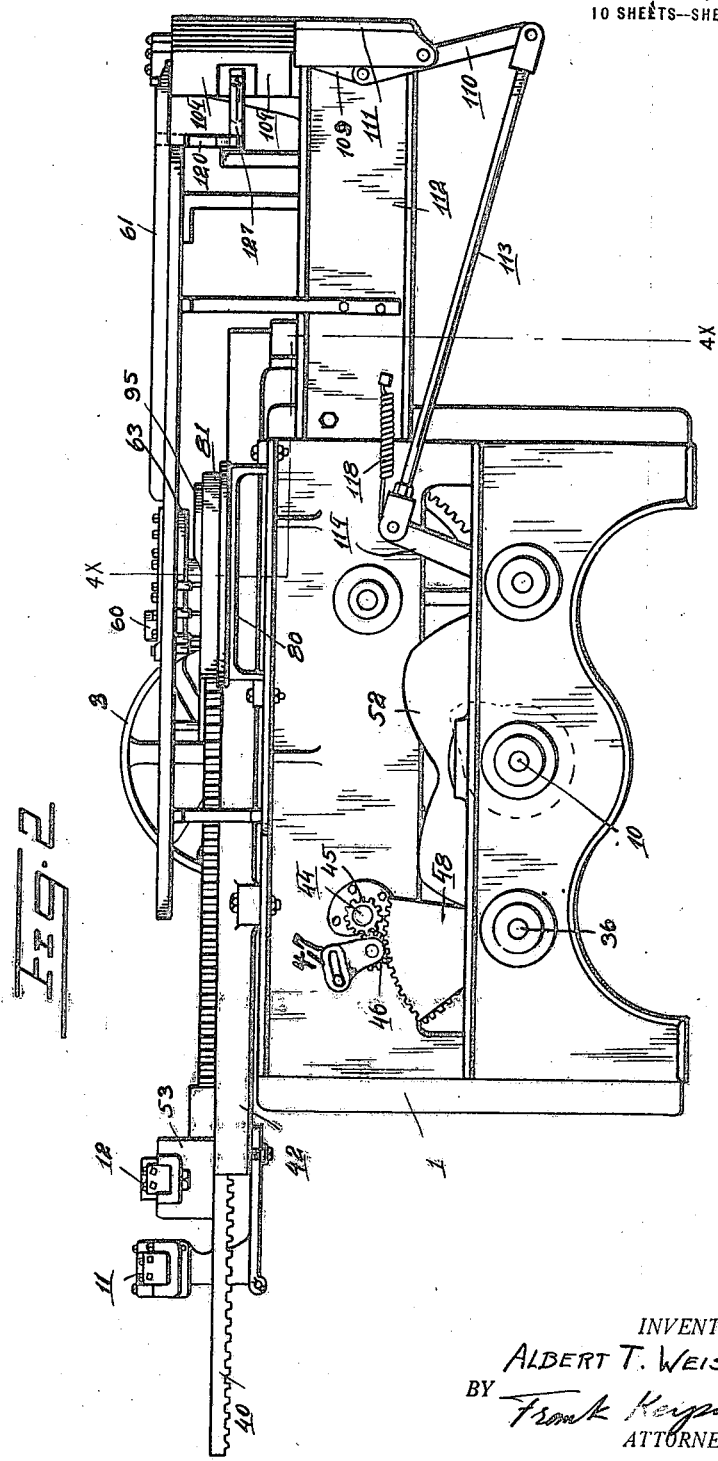
Figure 2 is a side elevation of the left hand side of the machine.
Figure 4:
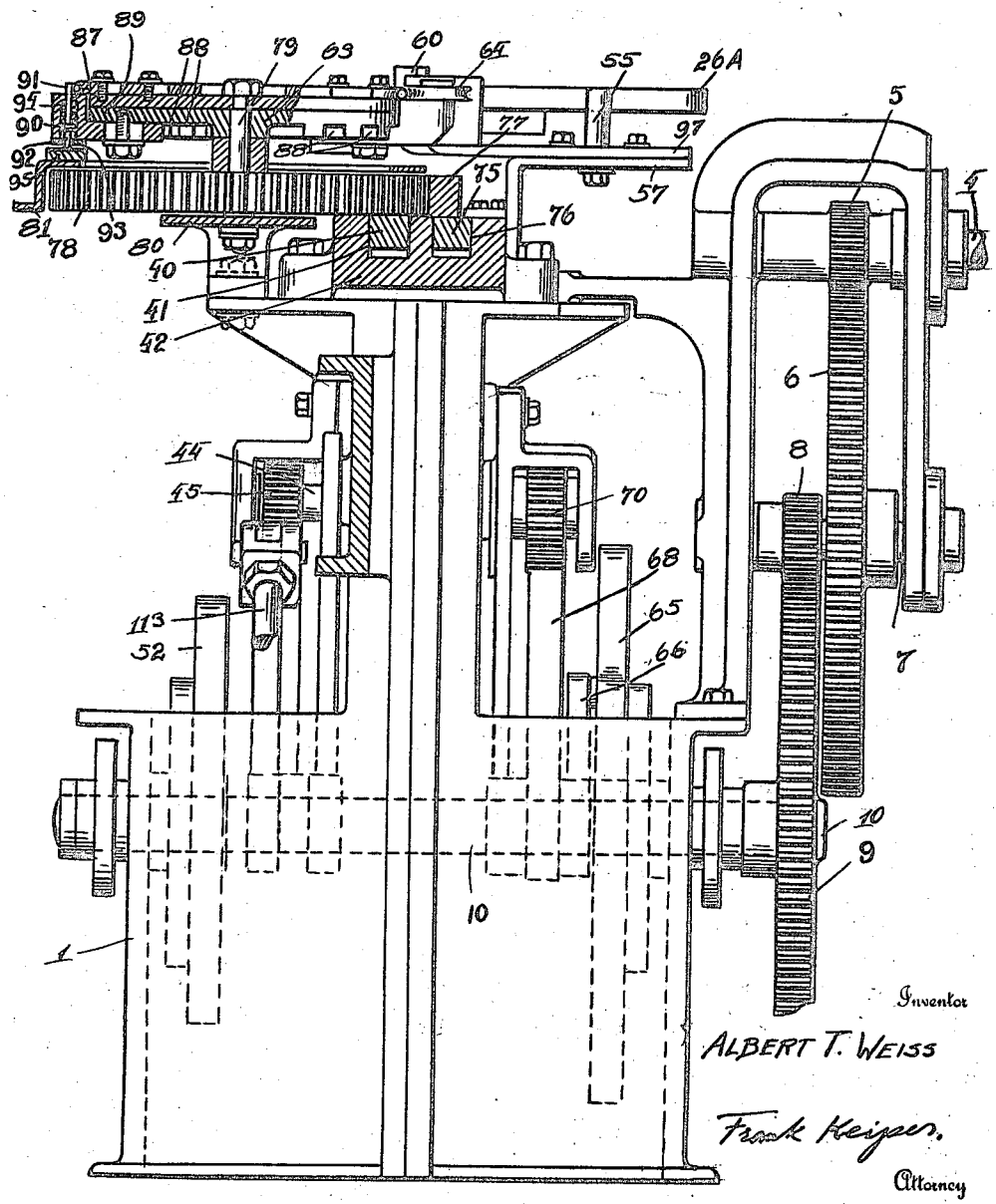
Figure 4 is a vertical sectional view of the machine on an enlarged scale, the section being taken on the line 4×—4× of Figure 2.
Figure 5:
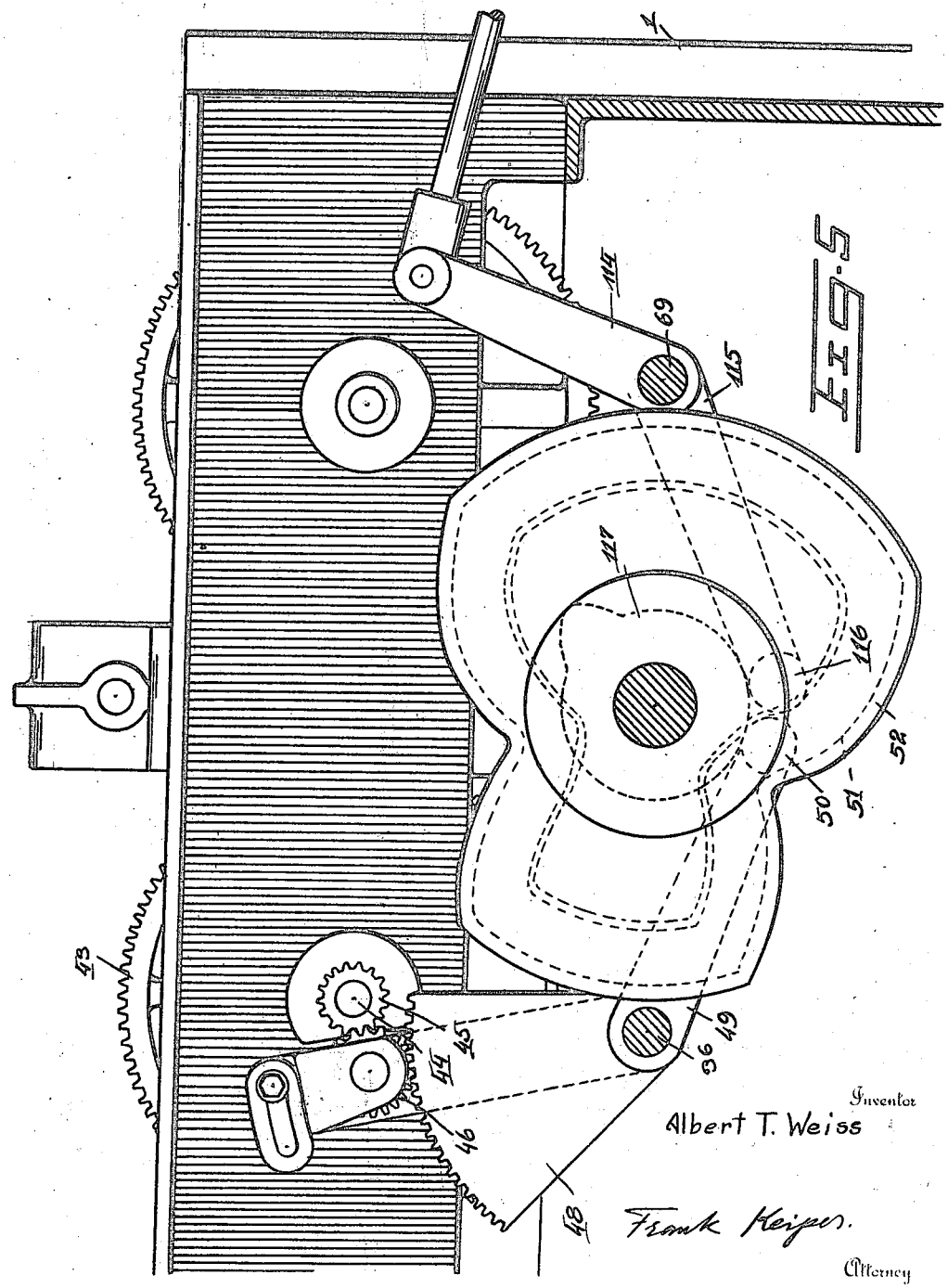
Figure 5 is an enlarged detail sectional view of a portion of the frame of the machine showing the driving mechanism for the wire feeding and cutting mechanism.

The stud 79 is supported in a bracket 80 mounted on top of the frame 1 adjacent to the bed plate 42. The bracket has the shape of an inverted U and the sides thereof are clamped to the frame 1 by suitable bolts as illustrated in Figure 2. Supported by the bracket 80 and surrounding the stud 79 is the casing 81. This casing encircles the gear 78 except at the point where the gear meshes with the rack 76 at which point the casing 81 is cut away as indicated at 82 in Figure 10. Keyed or otherwise suitably fastened to the gear 78 in order to rotate therewith around the stud 79 is the turntable 83. This turntable carries at the top a series of segmental plates 84, 84, that are bolted to the turn table by a pair of cap screws 85, 85, a pair of slots 86, 86 being provided in each of the segmental plates through which the cap screws are adapted to pass to be threaded into the turn table proper as indicated in Figure 4.

At the periphery, each of the segmental plates is provided with an undercut groove 87 and the grooves of all of the segmental plates form a continuous groove around the periphery of the turn table 83. The slots 86 in the segmental plates are provided to permit a radial adjustment of the segmental plates on the turntable and with this adjustment the diameter of the perimeter formed by all the segmental plates can be increased or decreased for the purpose of changing the diameter of the loop that is to bend thereon as will hereinafter be described.

At the under side the turntable is provided with a series of radial slots 88 into which the brackets 89 are adapted to be clamped. Each of these brackets is formed by a horizontal member which has on the outer end a vertical cylinder formed thereon. The horizontal member is provided with a slot through which a cap screw is adapted to pass and clamp the member into one of the radial slots 88 on the under side of the turntable. The slot is provided for radial adjustment of the brackets 89 corresponding to the radial adjustment of the segmental plates 84 at the top of the turntable.

Each of the vertical cylinders formed at the ends of each of the brackets 89 has a piston 90 adapted to slide up and down therein. This piston carries a pin 91 projecting upwardly therefrom and a pin 92 at the bottom projecting downwardly therefrom. The pin 91 is adapted to move in and out of an opening in the top of the cylinder and the pin 92 is adapted to move in and out of a hole in the plate 93 closing the bottom of the cylinder. In the cylinder and spaced between the piston 90 and the upper end of the cylinder is provided the expansion spring 94. This spring normally forces the piston to its lowest position in the cylinder in which position the upper end of the pin 91 is held flush with the top of the cylinder and does not project out therefrom while the pin 92 is forced out of the bottom of the cylinder and projects a predetermined distance out therefrom.

Mounted on top of the casing 81, and encircling approximately 180 degrees of the central opening in which the turn table 83 is mounted to rotate, is the cam rail 95. This cam rail forms part of the path over which the pins 92 carried on the pistons 90 travel. On the rotation of the turn table the pins 92 travel over the casing until the cam rail 95 is reached when the pins ride up on the rail and are forced up into the cylinder by it. This in turn raises the piston 90 on the inside of the cylinder against the pressure of the spring 94 and forces the pin 91 out of the top of the cylinder adjacent to the grooves formed in the perimeter of the segmental plates 84.

As the pins 92, projecting out from the bottom of the cylinders of the brackets 89, ride up on the cam rail 95 one by one, the pins 91 in the upper end of the cylinder project out therefrom for a purpose that will presently appear. Preceding all of the brackets 89, of which preferably six are used as shown in Figures 1 and 10, is the bracket 96 which carries the bending roller 64. The bracket 96 is clamped into one of the radial slots 88 in the same manner as is described in connection with the brackets 89 and is therefore radially adjustable to correspond with the radial adjustment of the brackets 89. The bending roller is mounted to rotate idly on top of the bracket 96 and the periphery thereof is grooved similar to the periphery of the top of the turntable formed by the segmental plates.

Mounted on top of the angle plate 55 is a bracket 97 (see Figures 1, 3 and 4) which projects toward the turntable and carries on the outer end thereof the guide block 60. This guide block is provided with the duct 99 and the wire to be bent passes therethrough and is held thereby tangential to the groove formed on the turntable. The segmental plates of the turntable have a radial adjustment as heretofore pointed out, by means of which the radius of the turntable can be increased or decreased. A corresponding adjustment of the guide block toward or away from the center of the turntable is therefore necessary so that the duct thereof is at all times tangential to the periphery of the turntable as above pointed out. The bracket 97 carrying the guide block 60 is, therefore, made adjustable on the plate 55 as indicated in Figure 1.

The bending operation takes place after the wire has been fed by the feeding mechanism to the end of the curved guide 61. At this point the turntable starts to rotate, it being driven by the motion of the cam 65. The cam in turn transmits its motion to the lever 66, segmental gear 68, pinions 70 and 72, and the gear 74. The gear 74 reciprocates the rack 75 which rotates the gear 78 through the rack 77 forming part of the rack 75.

On the rotation of the gear 78 the turntable 63 with its brackets carrying the bending roller 97 and the guard pins 91 rotate with it. The wire that passes between the periphery of the turntable and the bending roller 64 and is held stationary by the clamp 11 is thus folded against the periphery so that the outer end thereof swings away from the curved guide 61 until it has reached the dotted line position indicated with reference numeral 100 in Figure 1. The actual bending is performed by the bending roller 64. On the rotation of the turntable this roller bends a section of the wire that passes between it and the periphery of the turntable against the perimeter thereof, while the remainder of the wire is being held stationary by the clamp 12. The guide pins which follow the bending roller project one by one above their housing as their lower end thereof engages or rides over the stationary cam 95. The pins in projecting above their housing also project up in front of the wire that is being bent around the turntable and in doing so prevent the wire bent by the bending roller from springing away from the turntable after the bending roller has performed its bending operation thereon. After this bending operation has been completed the bending roller and the guide pins carried on the turntable return to their original position on the reverse motion of the rack 75 caused by the further rotation of the cam 65, it being understood that a portion of the cam surface of the cam is designed to move the rack in one direction while the other portion of the cam surface is designed to move the rack in the reverse direction during one-half revolution of the cam. The layout of the cam surfaces are such that the motion of the rack is perfectly timed with the motions of the co-operating parts such as the feeding and clamping devices heretofore described.

The guide pins 91 in returning to their normal position on the reverse motion of the turntable after having bent the wire into a half circle, serve to hold the bent portion of the wire against the perimeter of the turntable and prevent its springing away therefrom. The guide pins project up from their respective housings until allowed to recede therein at the beginning of stationary cam 95. A new section of wire is then fed forward and afterwards bent around the turntable in the same manner as above described.

Both the cam 52 and the cam 65 are grooved cams and the levers 49 and 66 respectively are operated by the cam through an antifriction roller that is carried on the end of each of these levers and projects into the cam groove. A positive motion is thus given to the levers by the cams in either direction.

The clamp 12 which has previously been returned to its original position after having fed the wire to the end of the curved guide, begins to take another hold on the wire after the loop has been formed thereon and starts to feed the wire with the loop toward the curved guide. On reaching the curved guide the wire is held rigid again and the turntable begins to rotate again forming a second loop on the wire in the same manner as was described in connection with the first bend made by the turntable. The two bends then form the oval shaped loop as shown in Figure 11. The clamp which in the meantime has again returned to its original starting position then takes another hold on the wire and feeds it forward carrying with it the oval loop formed at the outer end thereof. On reaching the end of the curved guide 61 the wire projects under the ledger blade 106 forming part of the wire cutting mechanism in order to permit this mechanism to sever the oval loop thus formed from the remainder of the wire fed forward by the clamp.

In forming the last bend on the wire to complete the oval loop, a bend larger than is necessary is being formed by the turntable and on reaching the cutting mechanism the extra portion of the bend is severed from the oval shaped loop and left on the outer end of the wire. This small bend conforms to the curvature of the end of the curved guide 61 and forms a portion of one of the bends that complete the loop of wire made with this machine. The first bend made by the machine is utilized to furnish the curved end of the wire necessary to complete the first loop formed by the machine. For this purpose the beginning of the wire is fed to a point on the straight section of the guide 61 as indicated in the diagrammatic view illustrated in Figure 12. The portion of the wire located at the right of the turntable is then formed around the periphery thereof as indicated in Figure 13 to form an approximately half circle on the end of the wire. This half circle is then fed forward again but this time until the curved end of the wire lays snug against the end of the curved guide 61 as illustrated in Figure 14. The end of the wire indicated in dotted lines in Figure 14, and forming part of the half circle formed on the end of the wire, is then cut off by the cutting mechanism leaving a short section thereof on the end of the wire as illustrated in Figure 15. The wire is then ready to be operated upon and the machine performs the necessary functions to bend and form the wire into successive loops of wire.

The short section of the wire that is cut off from the bend that is formed first to provide a curved end on the wire, necessary to complete the succeeding loop, is the only portion of the wire fed from the reel to the machine that is wasted.

The successive stages in the forming of the first loop on the wire bending machine are diagrammatically illustrated in Figures 12 to 24 inclusive. It is understood that the wire is being fed from a continuous reel of wire that is placed at the end of the machine, the wire being drawn from the reel through a straightening machine by the clamp 12 thereof.

In Figure 16 which illustrates the first operation in the bending of the loop the wire has been fed from the reel so that its outer end extends to the end of the straight portion of the curved guide 61.

Figure 17 illustrates the second operation which consists in bending the extended end of the wire at the right of the turntable around half of the perimeter of the turntable thus forming the first half circle of the loop.

In Figure 18 the wire with the half circle formed thereon is again fed forward but this time to the end of the curved guide 61. This is made possible because the curve of the half circle formed on the wire conforms to the curve of the guide and permits its laying snug against the guide.

The next operation is illustrated in Figure 19 and consists in bending the second circle to complete the loop. This is done by bending the end of the wire at the right of the turntable with the first half circle formed thereon around half of the turntable so that the first half circle bent on the end of the wire is swung to the left of the new half circle and the straight end of the wire is placed adjacent to the succeeding section of the wire, from which the next loop will be formed.

The loop formed in this way is then again fed forward to the end of the curved guide 61 where it is severed from the remaining portion of the wire at 102 by the cutting mechanism that will hereinafter be described. This last feeding operation is illustrated in Figure 20.

The small section of the half circle left on the end of the wire as illustrated in Figure 20 permits the end of the wire to extend the full length of the curved guide to the point where the loops formed by the machine are being cut off. The forming of the second loop as well as the loops formed from the same wire is the same as is described in connection with the forming of the first loop, and is illustrated in Figures 15 to 20 inclusive. From this it will be seen that on bending the second half circle of the loop, the small section of the half circle left on the end of the wire from the preceding loop overlaps a similar section of the second half circle so that when the completed loop is fed forward to the end of the curved guide to the cutting mechanism, this section of the preceding half circle will take the place of the section that is being cut off from the half circle by the cutting mechanism. A part of the loop just formed is left on the end of the wire from which the next wire loop is being formed. A complete loop such as illustrated in Figure 24 is thus formed and cut off by the machine.

*The wire cutting mechanism.*

This mechanism performs its operation last after the loop is completely formed and the machine is ready to form the next one. This mechanism is illustrated in Figures 1, 2, 5 and 9. It comprises the vertical cutting bar 103 which is square in cross section and is mounted to reciprocate in the sleeve 104. The cutting edge of the bar is formed by the upper edge of the side 105 of the square bar 103 that is located at the end of the curved guide 61. Mounted on top of the sleeve 104 at the end of the guide 61 is the ledger blade 106. This blade is formed on one side of the block 107 and projects over the edge of the sleeve past which the cutting edge 105 is moved. The wire, when fed to the end of the curved guide, is placed between the ledger blade and the cutting edge of the cutting bar. In the edge of the blade is provided a small circular groove 105 that tends to hold the wire in place between the ledger blade 106 and the cutting edge 106ᴬ.

While the formed wire loop is being cut off by the cutting mechanism the wire is held against the guide 61 by means of the spring finger 120. This finger is fastened to the hub 121 which is pivoted on the stud 122 carried near the upper end of the bracket 123. A coil spring 124 is wound around the stud 122 in such a manner that its free end makes engagement with the hub 121 as illustrated in Figure 3. This spring forces the hub forwardly into engagement with the antifriction roller 125. The front side of the hub 121 has a cam surface 126 formed thereon which is held in engagement with the antifriction roller 125 carried on the end of the bracket 127 by the spring 124 as above pointed out. The bracket 127 in turn is fastened to the side of the cutting bar 103 and moves therewith. The casing 104 is cut away at the point where the bracket 127 is fastened to the side of the cutting bar to permit the bracket to move therewith.

On the upward movement of the cutting bar the bracket with its antifriction roller operates to rock the hub 121 on its stud 122 by reason of its engagement with the cam surface of the hub. This rocking motion of the hub swings the spring finger 120 from the full line position shown in Figure 9 to the dotted line position shown thereon. In the dotted line position the spring finger is yieldingly forced against the wire that is placed alongside the guide 61. This holds the wire in place against the side of the guide while the cutting operation takes place. On the downward movement of the cutting bar the bracket with its antifriction roller moves down with it and on so doing permits the coil spring to rock the hub 121 on the stud 122 to keep its cam surface in engagement with the antifriction roller. During this movement of the hub the spring finger 120 is swung away from the wire leaving it free for the next operation to be performed thereon. In holding the wire against the guide during the cutting operation the wire is always held in the same position between the ledger blade and the cutting edge of the cutting bar of the cutting mechanism. The cutting bar is reciprocated by the toggle formed by the toggle link 109 and the toggle lever 110. The toggle link is pivoted to the lower end of the cutting bar 103 with one end thereof and the other end is connected to the upper end of the toggle lever 110. The toggle lever 110 is pivoted to the downwardly extending bracket 111 supported below the sleeve 104 which in turn is supported by the main frame 1 of the machine by the horizontal arm of bracket 112.

The lower end of the toggle lever 110 has the connecting link 113 pivoted thereto which connects the toggle lever 110 with the rocking lever 114. This rocking lever forms a part of the bell crank 115 and is pivoted on the stud 69 mounted in the frame 1. The lower end of the bell crank 115 carries an antifriction roller 116 with which it makes frictional contact with the perimeter of the cam 117. The tension spring 118 stretched between the upper end of the lever 114 and a suitable point on the frame is adapted to hold the antifriction roller 116 in contact with the perimeter of the cam 117.

The cam 117 is keyed on the power shaft 10 and on the rotation of this shaft the cam surface 119 of the cam operates to force the bell crank away from the center of rotation of the cam. This rocks the bell crank so that the connecting link is pulled to the left and straightens out the toggle formed by the toggle lever 110 and the toggle link 109. This movement of the toggle raises the cutting bar so that the cutting edge 105 thereof shears off the wire projecting between it and the ledger blade 106.

The driving mechanism of the clamping, feeding, bending, and cutting mechanism is controlled by cams that are properly timed for each of the movements that are to be performed by them and during one complete revolution of the power shaft on which all of the cams are mounted, the clamping mechanism, feeding mechanism and bending mechanism are operated twice for only one operation of the cutting mechanism. For this reason the cams operating the clamping and feeding mechanisms have two active cam surfaces formed thereon while the cutting mechanism has but one. In this way two lengths of wire are fed and two bends are made to form the loop for but one cut-off to sever the completed loop from the remainder of the wire.

The different mechanisms of the machine are made adjustable so that different sizes of wire loops both in length and diameter may be formed thereby, as follows: The clamping jaws of the clamps are adjustable toward and away from each other for the purpose of making the machine adaptable for forming wire loops of different gauge wire.

The pins 54 and 55 are adjustable on their base to open and close the jaws of the clamp 12 at different points near each end of the travel thereof, thus making it possible to increase or decrease the length of wire fed by the feeding mechanism for the purpose of making a longer or shorter loop of wire.

The base on which the turntable is mounted to rotate is adjustable along the inverted U shaped bracket on which the base is supported. With this adjustment the wire may be bent at different points of the length of wire fed by the feeding mechanism in order to co-operate with the different adjustments made in the location of the pins for opening and closing the jaws of the clamp 12.

In addition to this the diameter of the turn table may be increased by the radial adjustment of the segmental plates, the bending roller and guide pins. In this way loops having different diameters may be bent with this machine.

The wire bending and forming machine is operated in connection with a wire straightening machine. This is illustrated in Figure 22 in which reference numeral 130 indicates a straightening machine of the rotary type. The wire passes through this straightening machine from the wire reel entering the rotating mandrel 131 at one end and leaving it at the other end after being straightened thereby. The mandrel of the straightening machine is driven by a belt that passes over the pulley 132 and the pulley in turn is connected to the mandrel by means of the clutch 133. The clutch 133 is controlled by the shifting arm 134. This arm is connected to the bell crank 135 which in turn is operated by the bell crank 136 through the connecting link 137. The bell crank 136 carries at its free end an antifriction roller which engages the cam 138. The cam surface of the cam 138 is laid out to operate the clutch 133 so as to stop the rotation of the rotating mandrel whenever the feeding mechanism is idle, that is, when no wire is being fed from the reel to the machine during the bending or forming operations thereof. This avoids having the wire subjected to excessive frictional contact in the rotating mandrel while the wire remains idle therein. The wire straightening machine may be any one of several types of machines constructed for straightening wire.

I claim:

1. In a wire bending and forming machine adapted to form oval shaped wire loops, the combination of a frame, a wire clamping mechanism provided at one end of said frame, a second wire clamping mechanism mounted to reciprocate on said frame, said second wire clamping mechanism being adapted to feed straight sections of wire from said first clamping mechanism, a wire cut off mechanism at the other end of said frame and a wire bending mechanism intermediate of said clamping and said cut off mechanism, said wire bending mechanism being adapted to bend a half circle on two consecutive sections of wire fed forward by said movable clamping mechanism, said half circles being bent to oppose each other to form an oval shaped loop, said cut off mechanism being adapted to cut off the formed loop from the end of the wire.

2. In a wire bending and forming machine adapted to form oval shaped wire loops, the combination of a frame, a turntable mounted to rotate on said frame, means for feeding wire past said turntable and tangentially thereto, a bending roller carried by said turntable to bend the wire against the periphery of said turntable on the rotation thereof.

3. In a wire bending and forming machine adapted to form oval shaped wire loops, the combination of a frame, a turntable mounted to rotate on said frame, a series of segmental plates mounted on top of said turntable and radially adjustable thereon, said segmental plates having a groove formed on the curved side thereof, the grooves of all of said segmental plates forming a continuous groove around the perimeter of said turntable.

4. In a wire bending and forming machine adapted to form oval shaped wire loops, the combination of a frame, a turntable mounted to rotate on said frame, a series of segmental plates mounted on top of said turntable and radially adjustable thereon, said segmental plates having a groove formed on the curved side thereof, the grooves of all of said segmental plates forming a continuous groove around the perimeter of said turntable, a series of radially adjustable brackets mounted on the under side of said turntable and projecting out from the periphery therefrom, said brackets having a vertical cylinder formed on the outer end thereof, a piston mounted to slide in said cylinder, a guide pin carried on said piston and adapted to move in and out of said cylinder on the raising and lowering of said piston, and means for raising said piston and holding said guide pins projected out of said cylinder during a part of the rotation of said turntable and means to lower said piston and holding said guide pins in said cylinder during another part of the rotation of said turntable.

5. In a wire bending and forming machine adapted to form oval shaped loops, the combination of a frame, a turntable mounted to rotate on said frame, a series of segmental plates mounted on top of said turntable and radially adjustable thereon, said segmental plates having a groove formed on the curved side thereof, the grooves of all of said segmental plates forming a continuous groove around the perimeter of said turntable, a bracket mounted radially on said turntable, a forming roller mounted to rotate horizontally on the outside of said bracket and adjacent to the peripheral groove formed on said turntable, the wire to be formed being adapted to pass between the peripheral groove of said turntable and the periphery of said forming roller.

6. In a wire bending and forming machine adapted to form oval shaped wire loops, the combination of a frame, a bracket mounted horizontally adjustable on said frame, a turntable mounted to rotate on said bracket, a stationary casing supported on said bracket and surrounding said turntable, a stationary cam provided on said casing, a forming roller carried on said turntable, said forming roller being adapted to bend the wire against the periphery of said turntable on the rotation thereof; means carried on said turntable and controlled by said cam to hold the wire bent by said forming roller against the periphery of said turntable, and means for intermittently rotating said turntable in opposite directions.

7. In a wire bending and forming machine adapted to form oval shaped wire loops, the combination of a frame, a slide mounted to horizontally reciprocate on said frame, a bracket carried on said slide, a clamping mechanism mounted on said bracket, said clamping mechanism comprising a movable and a stationary jaw, a toggle adapted to move said movable jaw toward and away from said stationary jaw, a pair of stationary brackets mounted on said frame one near each end of the travel of said slide, a pin adjustably mounted on said brackets and adapted to make engagement with said toggle lever, one of said pins being adapted to move said movable jaw toward said stationary jaw and the other of said pins being adapted to move said movable jaw away from said stationary jaw to open and close said clamping mechanism, a turntable mounted to rotate on said frame near the end of the travel of said clamping mechanism, the periphery of said turntable being tangential to the clamp of said clamping mechanism, said clamping mechanism being adapted to feed a section of wire past said turntable and means to bend a portion of the wire fed past said turntable.

8. In a wire bending and forming machine adapted to form oval shaped wire loops, the combination of a frame, a clamping mechanism mounted near one end of said frame, a feeding mechanism adapted to co-operate with said clamping mechanism, a cut off mechanism mounted at the other end of said frame, a turntable mounted to rotate on said frame intermediate of said clamping and said cut off mechanism, means to first open said stationary clamping mechanism, second to move said feeding mechanism and feed a section of wire to said cut off mechanism, third, bend a portion of the wire fed by said feeding mechanism around half of the periphery of said turntable, fourth, means to again operate said feeding mechanism to feed an additional section of wire to said cut off mechanism, fifth, means to bend a portion of the second section of wire around half of the periphery of said turntable to form a complete oval shaped loop on the end of the wire and sixth, means to cut off said oval shaped loop from said wire.

9. The process of forming an oval shaped wire loop which consists of (1) forming a bend on the end of the wire, (2) feeding the wire with the bend on the end past a forming mechanism, (3) bending a portion of the wire fed past the forming mechanism around said forming mechanism, (4) feeding a second section of wire with the two bends formed on the end thereof to said cut off mechanism, (5) bending a portion of the second section of wire around said forming mechanism to complete the wire loop with the original bent end of the wire overlapping a corresponding portion of the bend formed second on the wire by said forming mechanism, (6) cutting off the oval shaped loop formed from the wire leaving the overlapping section of the wire in place on the end thereof.

10. In a wire bending and forming machine adapted to form an oval shaped wire loop, the combination of a frame, a pair of racks mounted to reciprocate on top of said frame, a clamping mechanism mounted on one of said racks and a third rack provided on the other of said racks, a turntable mounted to rotate on said frame, said third rack being adapted to engage and rotate said turntable in both directions on the reciprocation of said rack, said clamping mechanism being adapted to clamp wire and feed the wire forward on the forward movement of said second rack, said turntable being adapted to bend a portion of the wire fed forward by said clamping mechanism.

11. In a wire bending and forming machine adapted to form oval shaped wire loops, the combination of a frame, a pair of intermittently driven gears mounted in said frame, a pair of racks mounted to horizontally reciprocate in said frame, said pair of gears being adapted to reciprocate said horizontal racks in said frame, a feeding mechanism, a bending mechanism, one of said racks being adapted to operate said feeding mechanism the other of said racks being adapted to operate said bending mechanism, a stationary clamp mounted at one end of said frame, a cut off mechanism mounted at the other end of said machine, said feeding mechanism being adapted to feed sections of wire from said stationary clamping mechanism to said cut off mechanism, said bending mechanism being adapted to bend a portion of the wire fed by said feeding mechanism.

12. In a wire bending and forming machine adapted to form oval shaped wire loops, the combination of a frame, a pair of intermittently driven gears mounted in said frame, a pair of racks mounted to horizontally reciprocate in said frame, said pair of gears being adapted to reciprocate said horizontal racks in said frame, a feeding mechanism, a bending mechanism, one of said racks being adapted to operate said feeding mechanism the other of said racks being adapted to operate said bending mechanism, a stationary clamp mounted at one end of said frame, a cut off mechanism mounted at the other end of said machine, said feeding mechanism being adapted to feed sections of wire from said stationary clamping mechanism to said cut off mechanism, said bending mechanism being adapted to bend a portion of the wire fed by said feeding mechanism, adjustable means to adjust the turntable in predetermined positions between said stationary clamping mechanism and said cut off mechanism.

13. In a wire bending and forming machine adapted to form oval shaped wire loops, the combination of a frame, a turntable mounted on said frame, means for intermittently rotating said turntable in either direction, a feeding mechanism, said feeding mechanism being adapted to feed sections of wire past said turntable, means carried on said turntable to bend the wire around a portion of the perimeter thereof, means to hold the wire stationary while being bent by said turntable.

14. In a wire bending and forming machine adapted to form oval shaped wire loops the combination of a frame, a feeding mechanism mounted to slide on said frame, a bending mechanism mounted to rotate on said frame, a wire straightening mechanism adapted to co-operate with said wire feeding and bending mechanism, a driving mechanism for both said feeding and said bending mechanism mounted in said frame, and means controlled by said driving mechanism to start or stop said wire straightening mechanism.

15. In a wire bending and forming machine adapted to form oval shaped wire loops the combination of a frame, a turntable mounted to rotate on said frame, adjustable means to increase or decrease the diameter of said turntable, a bracket adjustably mounted on said frame, a guide block supported on said bracket, said guide block having a duct provided therein tangentially to said turntable, wire adapted to be guided to said turntable by said guide block.

16. In a machine for forming loops from a continuous wire, the combination of means for feeding a length of wire in a straight path, means for forming a half round bend on the end of the length of wire thus fed forwardly said feeding means being adapted to feed a second length of wire in a straight path with a first length of wire and half round bend formed thereon carried on the outer end thereof said forming means being adapted to bend a half round bend on the end of the second length of wire fed by said feeding means to complete an oval shaped wire loop with said first length of wire and its bend and means for cutting the formed loop from the continuous wire.

In testimony whereof I affix my signature.

ALBERT T. WEISS.